United States Patent
French et al.

(10) Patent No.: US 9,004,961 B1
(45) Date of Patent: Apr. 14, 2015

(54) MARINE OUTBOARD ENGINE HAVING AN AUXILIARY BATTERY CHARGING SYSTEM

(71) Applicant: BRP US Inc., Sturtevant, WI (US)

(72) Inventors: Michael French, Pleasant Prairie, WI (US); Jeremiah Gillis, Milwaukee, WI (US)

(73) Assignee: BRP US Inc., Sturtevant, WI (US)

( * ) Notice: Subject to any disclaimer, the term of this patent is extended or adjusted under 35 U.S.C. 154(b) by 268 days.

(21) Appl. No.: 13/718,446

(22) Filed: Dec. 18, 2012

Related U.S. Application Data

(60) Provisional application No. 61/590,486, filed on Jan. 25, 2012.

(51) Int. Cl.
 *B60L 11/02* (2006.01)
 *B63H 20/00* (2006.01)

(52) U.S. Cl.
 CPC ...................... *B63H 20/00* (2013.01)

(58) Field of Classification Search
 USPC ........ 320/125, 138; 440/76, 77, 6; 123/195 P
 See application file for complete search history.

(56) References Cited

U.S. PATENT DOCUMENTS

| | | | |
|---|---|---|---|
| 5,111,132 A * | 5/1992 | Motose | 322/90 |
| 5,896,022 A * | 4/1999 | Jacobs, Sr. | 320/103 |
| 6,276,975 B1 | 8/2001 | Knight | |
| 7,250,689 B2 * | 7/2007 | Koerner et al. | 290/41 |
| 7,898,219 B2 * | 3/2011 | Felps | 320/134 |

OTHER PUBLICATIONS

Minnkota Battery Chargers [online], Johnson Outdoors Marine Electronics, Inc. 2008-2013, [retreived on Jun. 4, 2013]. Retreived from the internet: <http://store.minnkotamotors.com/category/392876/battery_chargers>.

* cited by examiner

*Primary Examiner* — Edwin Swinehart
(74) *Attorney, Agent, or Firm* — BCF LLP

(57) ABSTRACT

A marine outboard engine has an engine, a cowling, an alternator, and a controller electrically connected to the alternator. A primary charger is electrically connected to the alternator and is adapted to charge a primary energy storage device. A starter motor is selectively operatively connected to the engine and is adapted to be electrically connected to the primary energy storage device. An auxiliary charger is electrically connected to the alternator and is adapted to charge at least one auxiliary battery adapted to power an auxiliary device. The controller, the primary charger and the auxiliary charger are disposed inside the cowling. A vehicle bus connects the auxiliary charger with the controller to provide data from the controller to the auxiliary charger. A watercraft having the marine outboard engine and an auxiliary device is also disclosed.

44 Claims, 8 Drawing Sheets

MARINE OUTBOARD ENGINE HAVING AN AUXILIARY BATTERY CHARGING SYSTEM

CROSS-REFERENCE

The present application claims priority to U.S. Provisional Patent Application No. 61/590,486, filed Jan. 25, 2012, the entirety of which is incorporated by reference.

TECHNICAL FIELD

The present invention relates to auxiliary battery charging systems for marine outboard engines.

BACKGROUND

Typically, a marine outboard engine includes an alternator to generate electrical power when the outboard engine is in operation. A primary battery charger is provided in the outboard engine to receive a portion of this electrical power and uses it to charge a primary battery disposed externally of the outboard engine. The primary battery is used to supply electrical power to a starter motor of the outboard engine to permit starting of an engine of the outboard engine. The primary battery can also be used to supply DC voltage/current to various components and accessories provided on the outboard engine or a watercraft on which the outboard engine is mounted.

Some watercraft are also provided with one or more auxiliary batteries used to supply electrical power to one or more auxiliary devices. One example of such an auxiliary device is an electrical trolling motor. As would be understood, as the auxiliary device is used, the level of charge of the one or more auxiliary batteries goes down and eventually can no longer power the one or more auxiliary devices. As a result, the user of the watercraft has to wait until the watercraft is returned to shore to permit charging of the one or more auxiliary batteries by connecting them to a battery charger. This can involve having to remove the one or more auxiliary batteries from the watercraft.

Therefore, there is a need for a system for charging the one or more auxiliary batteries during operation of the watercraft.

One solution to the above inconvenience consists in providing an auxiliary charger in the watercraft. The auxiliary charger is electrically connected to the electrical wires connecting the primary battery charger to the primary battery. As such, the primary battery charger also powers the auxiliary charger. The auxiliary charger is connected to the one or more auxiliary batteries, thereby recharging them when the outboard engine is in operation.

However, since the auxiliary charger diverts some of the electrical power originally intended to recharge the primary battery, the primary charger may not recharge the primary battery as effectively as when the auxiliary charger is not provided.

Therefore, there is a need for a system for charging the one or more auxiliary batteries during operation of the watercraft that optimizes the charging of the primary battery.

SUMMARY

It is an object to ameliorate at least some of the inconveniences present in the prior art.

In one aspect, a marine outboard engine has an engine, a cowling covering the engine, a driveshaft operatively connected to the engine, and a propeller shaft operatively connected to the driveshaft. The propeller shaft is disposed at an angle to the driveshaft. An alternator is operatively connected to the engine to generate electrical power. A controller is disposed inside the cowling and is electrically connected to the alternator. A primary charger is disposed inside the cowling and is electrically connected to the alternator. The primary charger is adapted to charge a primary energy storage device. A starter motor is selectively operatively connected to the engine. The starter motor is adapted to be electrically connected to the primary energy storage device to be powered by the primary energy storage device. An auxiliary charger is disposed inside the cowling and is electrically connected to the alternator. The auxiliary charger is adapted to charge at least one auxiliary battery. The at least one auxiliary battery is adapted to power an auxiliary device. A vehicle bus connects the auxiliary charger with the controller to provide data from the controller to the auxiliary charger.

In a further aspect, the controller and the primary charger are part of an engine management module (EMM). The EMM outputs electric power to a first voltage rail via the primary charger. The first voltage rail is adapted to be connected to the primary energy storage device. The EMM outputs electric power to a second voltage rail being electrically connected to the auxiliary charger. A voltage of the first voltage rail is different from a voltage of the second voltage rail.

In an additional aspect, the voltage of the first voltage rail is 12 V and the voltage of the second voltage rail is 55 V.

In a further aspect, the engine includes at least one fuel injector. The at least one fuel injector is electrically connected to the second voltage rail.

In an additional aspect, the at least one auxiliary battery is one of a single auxiliary battery, a pair of auxiliary batteries connected in series, and a trio of auxiliary batteries connected in series. The auxiliary charger is adapted to charge any one of the single auxiliary battery, the pair of auxiliary batteries, and the trio of auxiliary batteries.

In a further aspect, the auxiliary charger includes a DC/DC converter.

In an additional aspect, the controller reduces an output current of the auxiliary charger when an input voltage of the auxiliary charger reduces.

In a further aspect, the engine includes at least one electrically powered component electrically connected to the second voltage rail. The controller reduces an output current of the auxiliary charger when an input voltage of the at least one electrically powered component is below a predetermined value.

In an additional aspect, the controller reduces an output current of the auxiliary charger when a voltage of the primary energy storage device is below a predetermined value.

In a further aspect, the vehicle bus connecting the auxiliary charger to the controller exchanges data between the controller and the auxiliary charger.

In an additional aspect, the data exchanged between the auxiliary charger and the controller includes data representative of at least one of current battery charging rate, charge level of the at least one auxiliary battery, estimated remaining time of use of the at least one auxiliary battery and temperature of at least one of the auxiliary charger and the at least one auxiliary battery.

In a further aspect, a first connector is electrically connected to the primary charger and is adapted to electrically connect to the primary energy storage device. A second connector is electrically connected to the auxiliary charger and is adapted to electrically connect to the at least one auxiliary battery.

In an additional aspect, the vehicle bus is a controlled area network (CAN) bus.

In a further aspect, an open-loop liquid cooling system is in thermal communication with the engine for cooling the engine. A portion of the open-loop cooling system is in thermal communication with the controller.

In an additional aspect, another portion of the open-loop cooling system is in thermal communication with the auxiliary charger.

In a further aspect, the primary energy storage device is a primary battery.

In an additional aspect, the primary energy storage device is disposed externally of the cowling.

In a further aspect, the at least one auxiliary battery is disposed externally of the cowling.

In an additional aspect, the auxiliary device is a trolling motor.

In a further aspect, the data provided by the controller to the auxiliary charger is representative of at least one of an operational state of the primary charger and a charge level of the primary energy storage device. The operation of the auxiliary charger is adjusted based at least in part on the data.

In another aspect, a watercraft has a hull, an auxiliary device connected to the hull, at least one auxiliary battery electrically connected to the auxiliary device to power the auxiliary device, a marine outboard engine connected to the hull, and a primary energy storage device electrically connected to the marine outboard engine. The marine outboard engine includes an engine, a cowling covering the engine, a driveshaft operatively connected to the engine, a propeller shaft operatively connected to the driveshaft, the propeller shaft being disposed at an angle to the driveshaft, and a propeller connected to the propeller shaft. An alternator is operatively connected to the engine to generate electrical power. A controller is disposed inside the cowling and is electrically connected to the alternator. A primary charger is disposed inside the cowling and is electrically connected to the alternator. The primary charger is electrically connected to the primary energy storage device to charge the primary energy storage device. A starter motor is selectively operatively connected to the engine. The starter motor is electrically connected to the primary energy storage device to be powered by the primary energy storage device. An auxiliary charger is disposed inside the cowling and is electrically connected to the alternator. The auxiliary charger is electrically connected to the at least one auxiliary battery to charge the at least one auxiliary battery. A vehicle bus connects the auxiliary charger with the controller to provide data from the controller to the auxiliary charger.

In an additional aspect, the controller and the primary charger are part of an engine management module (EMM). The EMM outputs electric power to a first voltage rail via the primary charger. The first voltage rail is connected to the primary energy storage device. The EMM outputs electric power to a second voltage rail being electrically connected to the auxiliary charger. A voltage of the first voltage rail is different from a voltage of the second voltage rail.

In a further aspect, the voltage of the first voltage rail is 12 V and the voltage of the second voltage rail is 55 V.

In an additional aspect, the engine includes at least one fuel injector.

The at least one fuel injector is electrically connected to the second voltage rail.

In a further aspect, the at least one auxiliary battery is one of a single auxiliary battery, a pair of auxiliary batteries connected in series, and a trio of auxiliary batteries connected in series. The auxiliary charger is adapted to charge any one of the single auxiliary battery, the pair of auxiliary batteries, and the trio of auxiliary batteries.

In an additional aspect, the auxiliary charger includes a DC/DC converter.

In a further aspect, the controller reduces an output current of the auxiliary charger when an input voltage of the auxiliary charger reduces.

In an additional aspect, the engine includes at least one electrically powered component electrically connected to the second voltage rail. The controller reduces an output current of the auxiliary charger when an input voltage of the at least one electrically powered component is below a predetermined value.

In a further aspect, the controller reduces an output current of the auxiliary charger when a voltage of the primary energy storage device is below a predetermined value.

In an additional aspect, the vehicle bus connecting the auxiliary charger to the controller exchanges data between the controller and the auxiliary charger.

In a further aspect, the data exchanged between the auxiliary charger and the controller includes data representative of at least one of current battery charging rate, charge level of the at least one auxiliary battery, estimated remaining time of use of the at least one auxiliary battery and temperature of at least one of the auxiliary charger and the at least one auxiliary battery.

In an additional aspect, a first connector is electrically connected to the primary charger and to the primary energy storage device. A second connector is electrically connected to the auxiliary charger and to the at least one auxiliary battery.

In a further aspect, the vehicle bus is a controlled area network (CAN) bus.

In an additional aspect, an open-loop liquid cooling system is in thermal communication with the engine for cooling the engine. In a further aspect, a portion of the open-loop cooling system is in thermal communication with the controller.

In a further aspect, another portion of the open-loop cooling system is in thermal communication with the auxiliary charger.

In an additional aspect, the primary energy storage device is a primary battery.

In a further aspect, the primary energy storage device is disposed externally of the cowling.

In an additional aspect, the at least one auxiliary battery is disposed externally of the cowling.

In a further aspect, the data provided by the controller to the auxiliary charger is representative of at least one of an operational state of the primary charger and a charge level of the primary energy storage device. The operation of the auxiliary charger is adjusted based at least in part on the data.

In an additional aspect, at least one display gauge is connected to the controller to display information representative of the data.

In a further aspect, at least one display gauge connected to the auxiliary charger via the vehicle bus to display information related to the auxiliary charger.

In an additional aspect, the auxiliary device is a trolling motor and the at least one auxiliary battery is at least one trolling motor battery.

In a further aspect, the auxiliary device is at least one of an electric cooler, a fridge, a stove, a fish finder and a pump of a livewell.

In a further aspect, at least one of a fish finder, a display gauge and a bilge pump is electrically connected to the primary energy storage device.

For purposes of this application, terms related to spatial orientation such as forwardly, rearwardly, upwardly, downwardly, left, and right, are as they would normally be understood by a driver operating a watercraft in a normal riding position, the watercraft having the marine outboard engine mounted on a transom thereof. It should also be understood that values stated herein for voltages and other electrical properties may have been simplified for clarity. For example, it will be appreciated by one skilled in the art that an electrical charger for charging a 12 volt battery will typically provide a voltage that is slightly higher than the target voltage of 12 volts.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
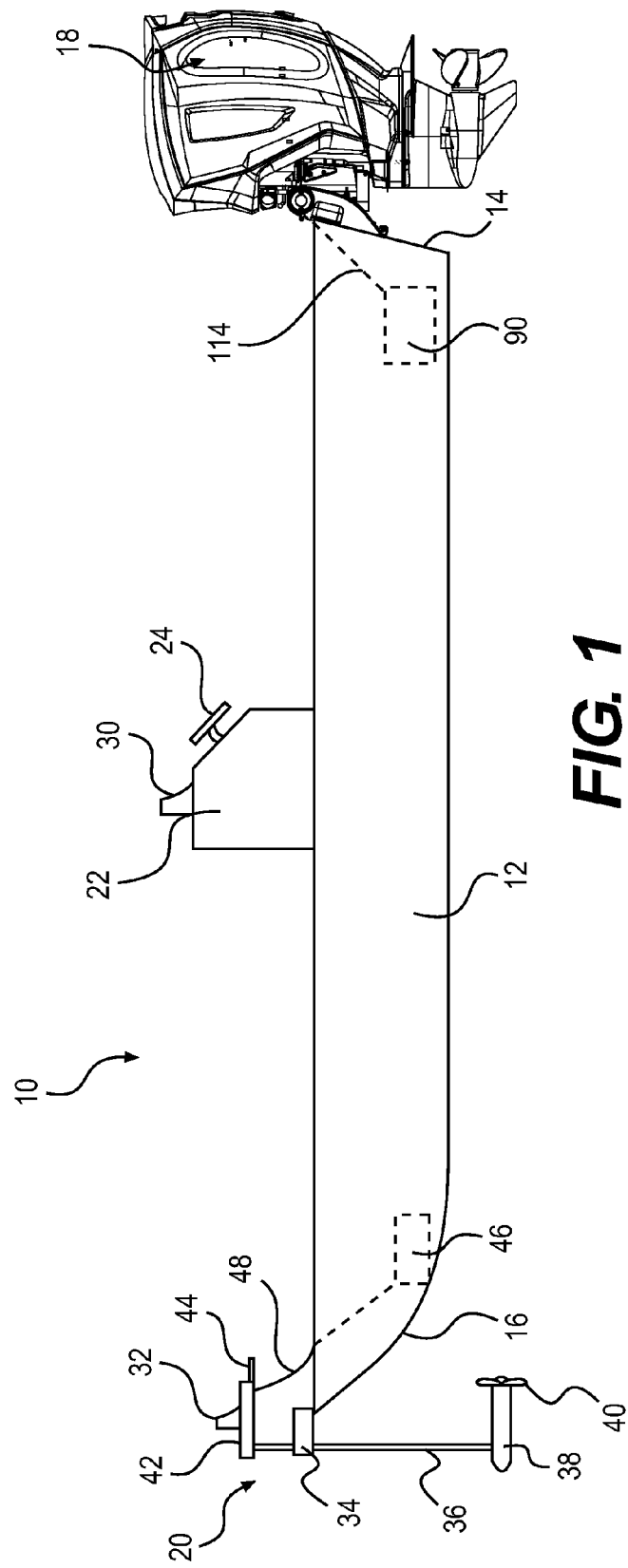
FIG. 1 is a left side elevation view of a watercraft having a marine outboard engine and a trolling motor.

FIG. 1 illustrates a watercraft 10 having a hull 12. The hull has a transom 14 and a bow 16. A marine outboard engine 18 is connected to the transom 14 to propel the watercraft 10. It is contemplated that more than one marine outboard engine 18 could be provided. A trolling motor 20 is connected to the bow 16 to propel the watercraft 10. Typically, a driver of the watercraft 10 would propel the watercraft 10 using one of the outboard engine 18 and the trolling motor 20 at a time. It is contemplated that the trolling motor 20 could alternatively be provided at the transom 14 or elsewhere along the hull 12 of the watercraft. It is also contemplated that more than one trolling motor 20. It is also contemplated that for some embodiments of the watercraft 10, the trolling motor 20 could be omitted. A driver console 22 is supported by the hull 12 near a central portion thereof. It is contemplated that the driver console 22 could be located elsewhere on the hull 12. A steering wheel 24 is mounted to the driver console 22. The steering wheel 24 operates a steering system (not shown) to steer the outboard engine 18. A throttle lever and a transmission lever (i.e. forward, reverse, neutral selector) (both not shown) are also disposed on the driver console 22. The throttle lever and the transmission lever are connected to the outboard engine 18 so as to operate a speed of an internal combustion engine 26 (FIG. 3) and a direction of rotation of a propeller 28 (FIG. 2), respectively, of the outboard engine 18. One or more display gauges 30 are also provided on the driver console 22 to provide the driver of the watercraft 10 with information such as, for example, watercraft speed, fuel level, and engine speed. Other information displayed on the one or more display gauges 30 will be discussed in more detail below. It is contemplated that the outboard engine 18 could be provided with a tiller assembly used to steer the outboard engine 18, control the speed of the engine 26 and a direction of rotation of the propeller 28. In such an embodiment, the steering wheel 24, the throttle lever and the transmission lever could be omitted, and as a result, the driver console 22 could also be omitted. A fish finder 32 is mounted on the trolling motor 20, but could be mounted elsewhere on the watercraft 10, such as on the driver console 22. It is contemplated that the fish finder 32 could be omitted. It should be understood that the watercraft 10 illustrated in FIG. 1 corresponds to one possible exemplary embodiment of a watercraft. Other configurations of watercraft are also contemplated. For example, the watercraft 10 could be provided with a deck, one or more seats and/or an enclosed cabin for the driver and passengers.

The trolling motor 20 will now be described in more detail. The trolling motor 20 is mounted to the bow 16 via a bracket 34. It is contemplated that the bracket 34 could allow the trolling motor 20 to be tilted or otherwise moved out of the water when not in use. A shaft 36 passes through the bracket 34. A motor housing 38 is located at a bottom of the shaft 36. It is contemplated that the motor housing 38 could be provided with a skeg. An electric motor (not shown) is housed inside the motor housing 38. The motor housing 38 is sealed to prevent the entry of water therein. A propeller 40 is connected to a shaft of the electric motor. A motor controls housing 42 is located at a top of the shaft 36. The various electronic motor controls (not shown) necessary for the control of the electric motor are housed in the motor controls housing 42. The electronic motor controls are electrically connected to the electric motor by wires (not shown) extending inside the shaft 36. A tiller handle 44 extends from the motor controls housing 42 and is used to steer the trolling motor 20. The speed of rotation of the electric motor, and therefore the propeller 40, is controlled by buttons on the housing 42 or on the tiller handle 44. Alternatively, it is contemplated that this speed of rotation could be controlled by twisting the tiller handle 44. It is also contemplated that this speed of rotation could also be controlled by a remote actuator such as a foot pedal or by a wireless remote control. It is also contemplated that an electric motor could be provided to steer the trolling motor and that this motor could be controlled remotely via a wired or wireless connection by an actuator such as buttons or pedals. It should be understood that the trolling motor 20 illustrated in FIG. 1 corresponds to one possible exemplary embodiment of a trolling motor. Other configurations of trolling motors are also contemplated.

The electric motor of the trolling motor 20 is powered by one or more batteries 46, referred to herein as auxiliary batteries 46. The one or more auxiliary batteries 46 are placed in the bow 16 of the hull 12. It is contemplated that the one or more auxiliary batteries 46 could be placed inside a waterproof container. The one or more auxiliary batteries 46 are connected by battery cables 48 to the electronic motor controls in the motor controls housing 42 which then supply the electric power to the electric motor as needed. In one embodiment, the one or more auxiliary batteries 46 are deep-cycle batteries designed for marine use. Deep-cycle batteries are designed to be deeply discharged on a regular basis. In one exemplary embodiment, the electric motor is a 12 volt DC motor and electric power is supplied by a single 12 volt auxiliary battery 46. In another exemplary embodiment, the electric motor is a 24 volt DC motor and electric power is supplied by a pair of 12 volt auxiliary batteries 46 connected in series, or a single 24 volt battery. In yet another exemplary embodiment, the electric motor is a 36 volt DC motor and electric power is supplied by a trio of 12 volt auxiliary batteries 46 connected in series, or a single 36 volt battery. Other battery arrangements are contemplated. For example, the 12 volt electric motor could be connected to a pair of 6 volt auxiliary batteries 46. It is contemplated that the electric motor could be of a different voltage and that the electric power would then be supplied by a single auxiliary battery 46 of a corresponding voltage or by a plurality of auxiliary batteries 46 connected in series to provide a corresponding voltage. It is contemplated that the one or more auxiliary batteries 46 could also power other auxiliary devices such as an electric cooler, a stove, a fridge, a fish finder or a pump of a livewell. It is also contemplated that the trolling motor 20 could be omitted as an auxiliary device and that only one or more other auxiliary devices are powered by the one or more auxiliary batteries 46.

Figure 2:
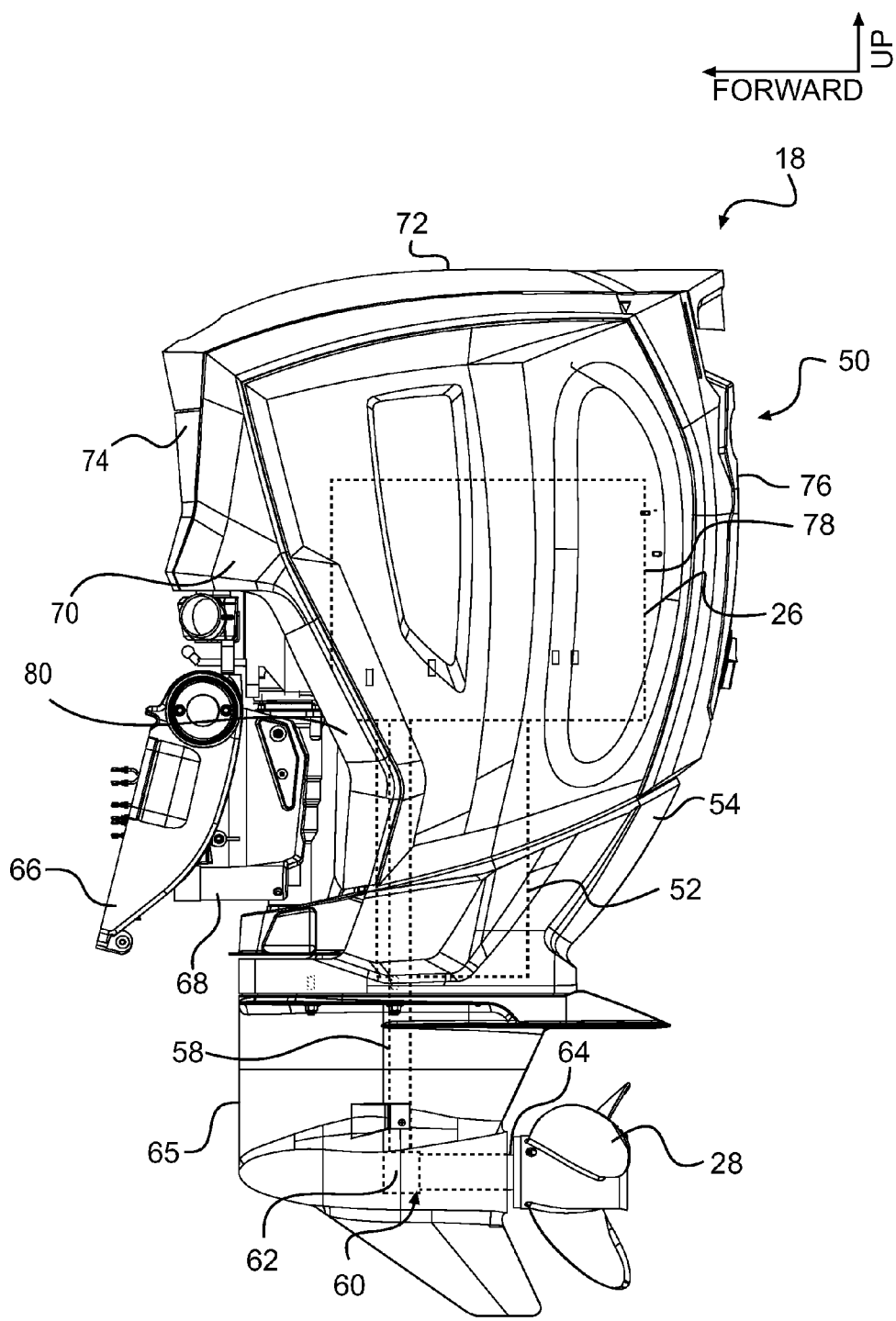
FIG. 2 is a left side elevation view of the marine outboard engine of the watercraft of FIG. 1.

Turning now to FIG. 2, the marine outboard engine 18 will be described in more detail. The marine outboard engine 18 has a cowling 50 protecting the engine 26 (shown schematically in FIG. 2). The engine 26 is a V-type, six cylinders internal combustion engine. It is contemplated that other types of engine 26 could be used. An exhaust system 52 (shown schematically), including an exhaust housing 54, is connected to the engine 26. An adaptor (not shown) can also be provided between the engine 26 and the exhaust housing 54. The exhaust system 52 is partially surrounded by the cowling 50. The engine 26 is coupled to a driveshaft 58 (shown schematically). The driveshaft 58 is coupled to a drive mechanism 60 (shown schematically), which includes a transmission 62 (shown schematically) and a bladed rotor, such as the propeller 28 mounted on a propeller shaft 64. The propeller shaft 64 is generally perpendicular to the driveshaft 58, but could be at other angles. The drive mechanism 60 could also include a jet propulsion device, turbine or other known propelling device. The bladed rotor could also be an impeller. The drive mechanism 60, the transmission 62 and the propeller shaft 64 are housed in a gear case 65. A stern bracket 66 is connected to the outboard engine 18 via a swivel bracket 68. The stern bracket 66 connects the marine outboard engine 18 to the stern 14 of the watercraft 10. The swivel bracket 66 partly houses a steering shaft (not shown) of the marine outboard engine 18.

The cowling 50 will now be described in more detail. The cowling 50 includes a central support structure 70 fixedly connected to the engine 26 and several panels 72, 74, 76 and 78 removably connected to the central support structure 70. The central support structure 70 includes left and right structural panels 80, only the left one of which is shown. The panels 72, 74, 76 and 78 include a cap 72, a front cover 74, a rear seam (or back) cover 76 and left and right (or lateral) side panels 78, only the left one of which is shown. It is contemplated that the cowling 50 could have more or less than the above recited panels. When removed, the panels 72, 74, 76 and 78 provide access to different parts of the engine 26. It should be understood that the cowling 50 illustrated in FIG. 2 corresponds to one possible exemplary embodiment of a cowling. Other configurations of cowlings are also contemplated.

Figure 3:
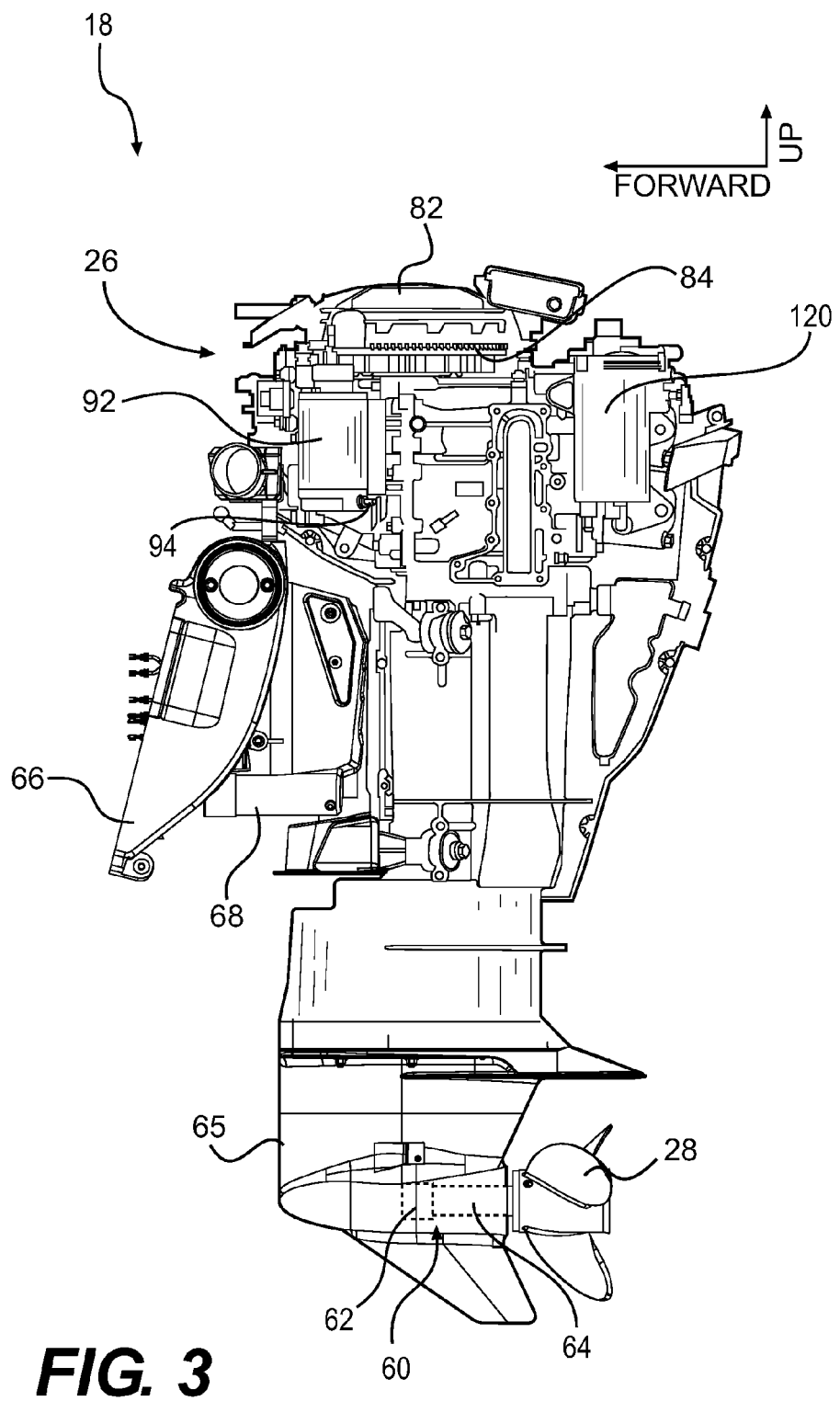
FIG. 3 is a left side elevation view of the marine outboard engine of FIG. 2 with a cowling thereof removed.
Figure 4:
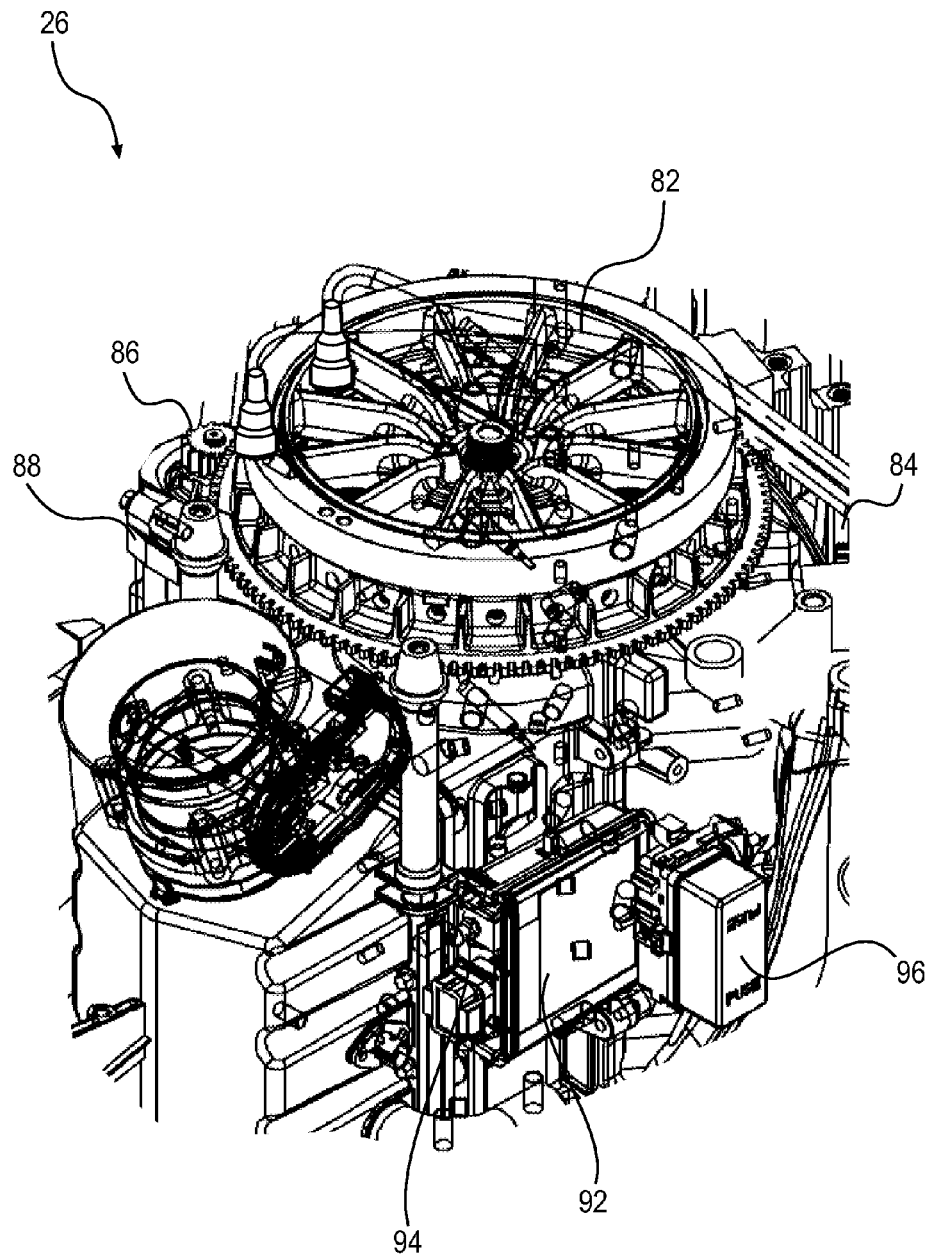
FIG. 4 is a perspective view taken from a front, left side of an upper portion of an internal combustion engine of the marine outboard engine of FIG. 2, with some components thereof removed for clarity.

As can be seen in FIGS. 3 and 4, an alternator 82 is located on a top of the engine 26. The alternator 82 is connected directly to the crankshaft (not shown) of the engine 26 and acts as a flywheel for the engine 26. The alternator 82 has a ring gear 84 that is selectively engaged by the pinion gear 86 of the starter motor 88 (FIG. 3). In operation, when a solenoid (not shown) of the starter motor 88 is activated by an electric current, the pinion gear 86 extends to engage the ring gear 84 of the alternator 82 and rotates the alternator 82 to crank and start the engine 26. The starter motor 88 and its solenoid are powered by a primary energy storage device. In the present embodiment, the primary energy storage device is a battery 90 (FIG. 1), referred to herein as the primary battery 90. The primary battery 90 is a rechargeable battery designed to provide the short bursts of high current to the starter motor 88 that are necessary to start the engine 26. In one exemplary embodiment, the primary battery 90 is a lead-acid 12 volt battery designed for marine use. The battery is disposed in the hull 12 near a transom 14 thereof, but could be placed elsewhere on the watercraft 10. It is contemplated that the primary battery 90 could be placed inside a water-proof container. It is also contemplated that more than one primary battery 90 could be provided. In an alternative embodiment, the primary energy storage device is at least one capacitor, such as an ultra-capacitor. An exemplary embodiment of ultra-capacitors used to power a starter motor on a marine outboard engine is described in U.S. Pat. No. 7,704,110, issued Apr. 27, 2010, the entirety of which is incorporated herein by reference.

As can also be seen in FIGS. 3 and 4, an auxiliary charger 92 is mounted on a left side of the engine. The auxiliary charger 92 is electrically connected to the one or more auxiliary batteries 46 to recharge one or more the auxiliary batteries 46 as will be described in greater detail below. The auxiliary charger 92 is adapted to charge batteries of various voltages and battery packs of various voltages. For example, the auxiliary charger 92 can be adapted to charge any one of the single 12 volt auxiliary battery 46, the pair of 12 volt auxiliary batteries 46 connected in series (24 volt total) and the trio of 12 volt auxiliary batteries 46 connected in series (36 volt total) described above. In one embodiment, the auxiliary charger 92 automatically determines the total voltage of the one or more auxiliary batteries 46 to be charged. In another embodiment, a user manually selects, with a switch for example, the total voltage of the one or more auxiliary batteries 46 to be charged by the auxiliary charger 92. The auxiliary charger 92 is provided with male hose connectors 94 to connect the auxiliary charger 92 to an open-loop cooling circuit via hoses (not shown). Water from the cooling circuit enters the auxiliary charger 92 via one connector 94, flows inside passages formed inside the auxiliary charger 92 to be in thermal communication with auxiliary charger 92, thereby cooling the auxiliary charger 92, and flows out of the auxiliary charger 92 via the other connector 94. The open-loop cooling circuit will be described in greater detail below with respect to FIG. 6. It is contemplated that the auxiliary charger 92 could also be cooled by heat sinks and/or fans in addition to or instead of the water cooling provided by the open-loop cooling circuit.

Figure 5:
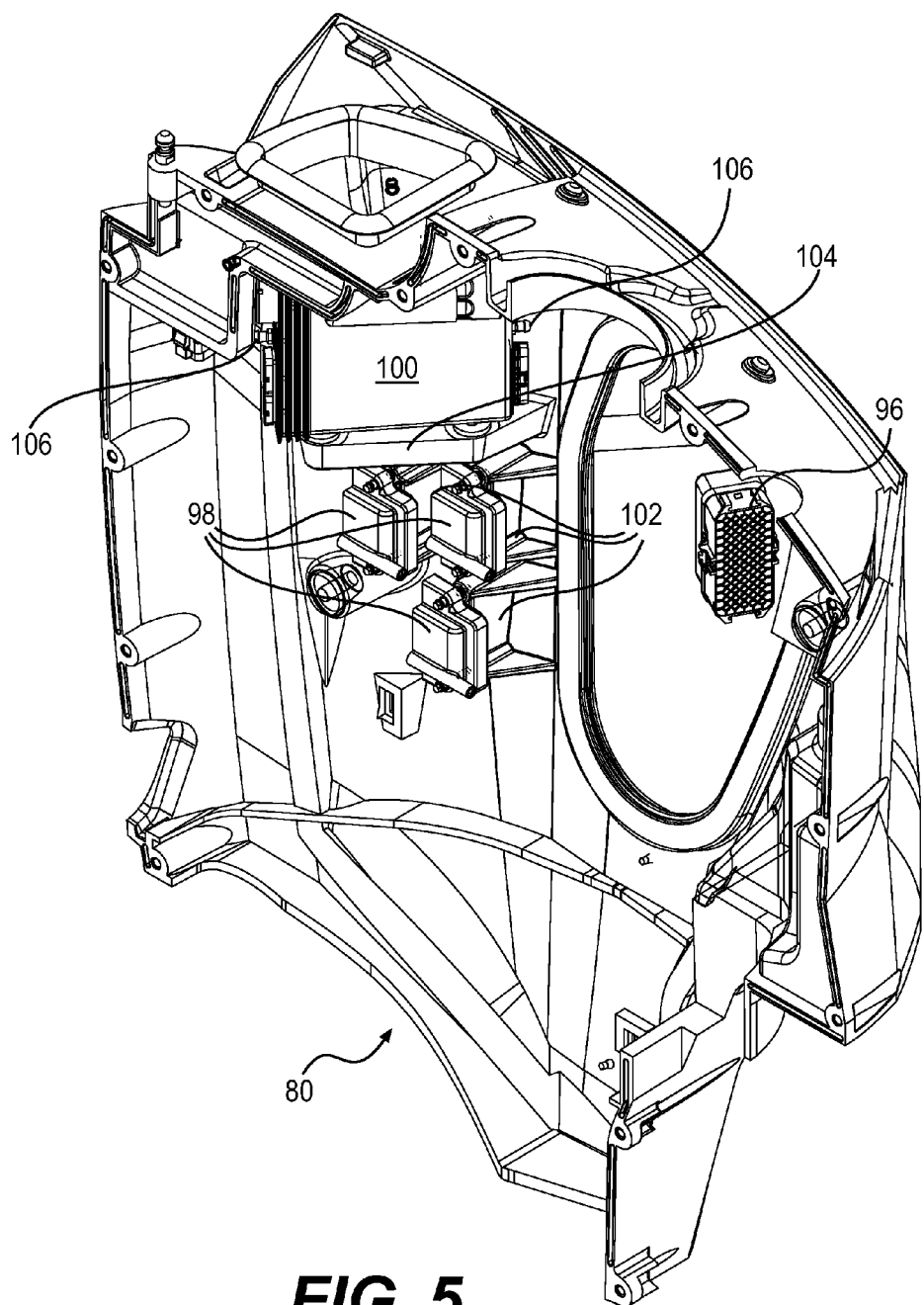
FIG. 5 is a perspective view taken from a front right side of a left structural panel of the cowling of the marine outboard engine of FIG. 2.

As can be seen in FIG. 5, the interior of the left structural panel 80 supports several engine sub-systems of the engine 26. Although not shown, the right structural panel 80 supports several other engine sub-systems. The engine sub-systems are used for the operation of the engine 26. The engine sub-systems supported by the left structural panel 80 are a fuse box 96, three ignition coils 98, an engine management module (EMM) 100, and an electrical wire harness (not shown). It is contemplated that one or more of these sub-systems could be mounted elsewhere on the outboard engine 18. For example, they could be mounted to the interior of the right structural panel 80 or of the cap 72 or on the engine 26. It is contemplated that other sub-systems could be mounted to the left structural panel, such as an oil reservoir, a water pump, a valve, an induction system, a fuel vapor separator, an oil pump, or a secondary fuel reservoir.

The ignition coils 98 are mounted to brackets 102 integrally formed with the panel 80. It is contemplated that more or less than three ignition coils 98 could be used. The EMM 100 is disposed on top of and is fastened to a shelf 104 integrally formed with the panel 80. The EMM 100 is provided with male hose connectors 106 to connect the EMM 100 to the open-loop cooling circuit via hoses (not shown). Water from the cooling circuit enters the EMM 100 via one connector 106, flows inside passages formed inside the EMM 100 to be in thermal communication with the components/circuits contained in the EMM 100, thereby cooling the components/circuits contained in the EMM 100, and flows out of the EMM 100 via the other connector 106. It is contemplated that the components/circuits contained in the EMM 100 could also be cooled by heat sinks and/or fans in addition to or instead of the water cooling provided by the open-loop cooling circuit.

Figure 7:
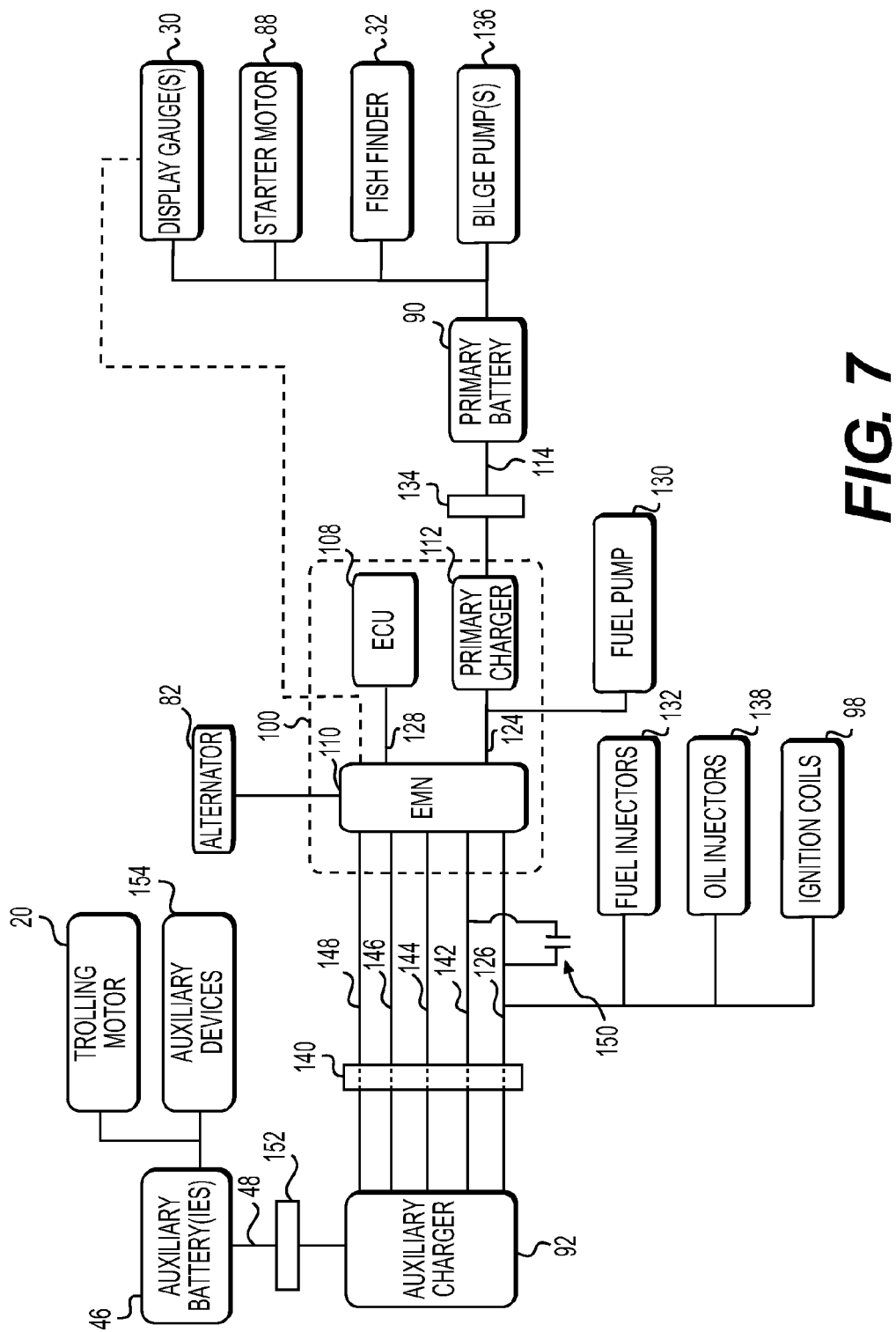
FIG. 7 is a schematic illustration of an electrical/electronic system of the watercraft of FIG. 1.

The EMM 100 contains an alternator control 108, a controller, in the form of a micro-controller 110, and a primary charger 112, all of which are shown schematically in FIG. 7. The EMM 100 also contains an engine control unit (ECU) (not shown). It is contemplated that at least some of the functions of the alternator control 108, the micro-controller 110, the primary charger 112, the ECU and other electronic components/circuit contained in the EMM 100 could be integrated into a common electronic component/circuit. The ECU controls the operation of the engine 26 (i.e. fuel injection, ignition timing, throttle opening, etc.) based on inputs from the driver, such as the position of the throttle lever for example, and inputs from various sensors, such as an engine speed sensor, a watercraft speed sensor, and a throttle position sensor for example. The alternator control 108 receives the electrical power generated by the alternator 82 supplies it to the various electrical components of the watercraft 10 as will be described in greater detail below. The micro-controller 110 controls the operation of the auxiliary charger 92 as will be described in greater detail below as will be described in greater detail below. The primary charger 112 is electrically connected to the primary battery 90 via battery cables 114 (FIG. 1) to recharge the primary battery 90 as will be described in greater detail below.

Figure 6:
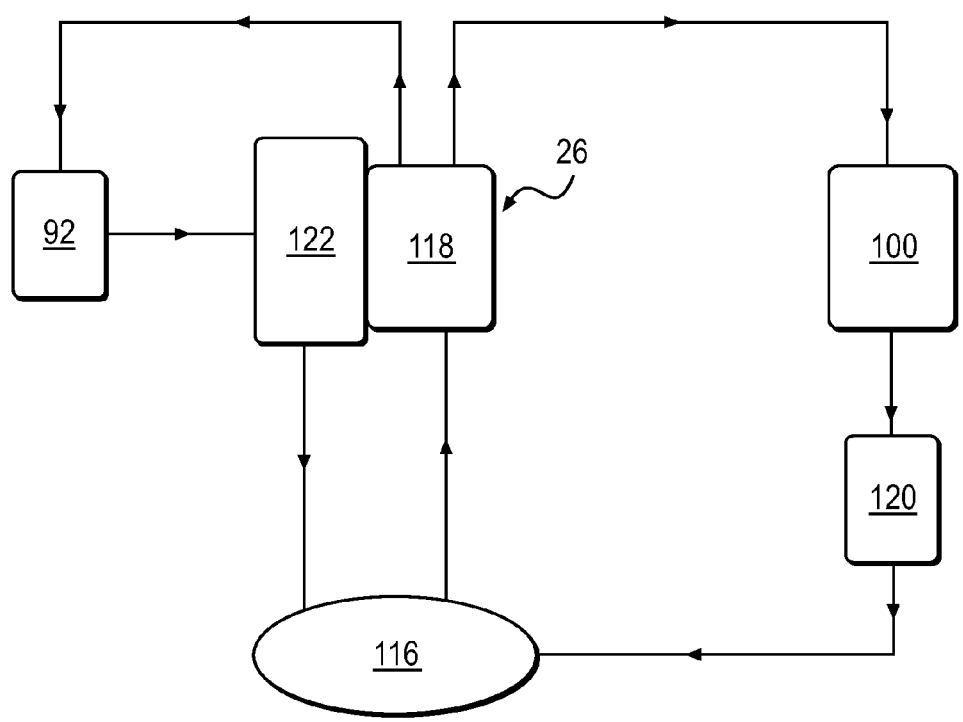
FIG. 6 is a schematic illustration of an open-loop cooling system of the marine outboard engine of FIG. 2.

Turning now to FIG. 6, the open-loop cooling system of the marine outboard engine 18 will be described. The coolant used in the open-loop cooling system is water from a body of water 116 in which the watercraft 10 operates. From the body of water 116, water is supplied to the engine block 118 of the engine 26. Water flows in passages defined in the engine block 118 to cool the engine block 118 and components found in the engine block 118. From the engine block 118, a portion of the water flows to the EMM 100 to cool the components/circuits contained in the EMM 100 as described above. From the EMM 100, water flows to a vapor separator 120 (shown in FIG. 3) of a fuel system of the engine 26. From the vapor separator 120, the water is returned to the body of water 116 via an outlet (not shown) on the back of the outboard engine 18 disposed above the water to provide a visual indication that the cooling system is operating properly. From the engine block 118, another portion of the water flows to the auxiliary charger 92 to cool the auxiliary charger 92 as described above. From the auxiliary charger 92 the water flows to a crankcase 122 of the engine 26. Water flows in passages defined in the crankcase 122 to cool the crankcase 122 and components found in the crankcase 122. From the crankcase 122, the water is returned to the body of water 116 via another outlet (not shown). Although not shown, one or more pumps pump the water through the open-loop cooling system. FIG. 6 illustrates only a portion of the open-loop cooling system. Water is also supplied to cooling jackets disposed around portions of the exhaust system 52 and/or is injected into the exhaust system 52 to cool the exhaust gases from the engine 26. The water used to cool the exhaust system 52 can be supplied from the water loops described above, in series or in parallel therewith, or from separate water loops. Other water passages are also provided to cool the cylinder heads (not shown) of the engine 26 and other components of the outboard engine 18. The above is one exemplary embodiment of an open-loop cooling system for the outboard engine 18. For example, it is contemplated that the components 92, 100, 118, 120, 122 could be connected in series (not necessarily in the order in which they are listed) such that a single water loop is provided to cool these components. It is also contemplated that the open-loop cooling system could be replaced by a closed-loop cooling system. In such an embodiment, a coolant other than water can be used and one or more heat exchangers are disposed in thermal communication with the body of water 116 to cool the coolant flowing therethrough.

Turning now to FIG. 7, an electrical/electronic system of the watercraft 10 will be described. The alternator 82 is connected to the alternator control 108 to supply AC power to the alternator control 108 when the engine 26 is in operation. The alternator control 108 includes a rectifier (not shown) and converts the AC power to DC power. It is contemplated that the alternator control 108 could control the configuration of the windings of the alternator 82 by connecting them in series or parallel relative to electrical load and engine speed should such a control of the alternator 82 be possible. The alternator control 108 then outputs DC power to a voltage rail 126 to which the primary charger 112 and the auxiliary charger 92 are electrically connected. The primary charger 112 outputs DC power from the EMM 100 to a voltage rail 124. A logic power supply (not shown) is connected to the alternator control 108 and outputs DC power to the micro-controller 110 via a voltage rail 128. It is contemplated that the logic power supply could be connected to the voltage rail 126 instead of the alternator control 108. In one embodiment, the three voltage rails 124, 126, 128 supply DC power at three different voltages. However, it is contemplated that two or all of the voltage rails 124, 126, 128 could supply DC power at the same voltage. In an exemplary embodiment, the voltage rail 124 supplies DC power at 12 volts, the voltage rail 126 supplies DC power at 55 volts, and the voltage rail 128 supplies DC power at 5 volts. Other voltages are contemplated. For example, some logic functions of the micro-controller 110 and/or the ECU may require power at 5 volts while some power control functions may require 15 volts. DC/DC converters (not shown) are provided as needed in or in connection with the logic power supply and the primary charger 112 to reduce (or increase as the case may be) the voltage level of the DC power from the alternator control 108 to correspond to the desired voltage level of the voltage rails 128 and 124 should this voltage level differ from the voltage of the DC power from the alternator control 108.

The ECU is connected to the voltage rail 128 to be powered thereby. Alternatively, the ECU could be connected to one of the voltage rails 124 and 128 and include a DC/DC converter to adjust the voltage level of the corresponding voltage rail 124 or 126 to a voltage level appropriate for the components of the ECU.

A fuel pump 130 is connected to the voltage rail 124 to be powered thereby. The fuel pump 130 pumps fuel from a fuel tank (not shown) and supplies it to fuel injectors 132 of the engine 26. It is contemplated that the fuel pump 130 could alternatively be connected to the primary charger 112 directly to be powered thereby.

The primary charger 112 is connected to the voltage rail 126 to be powered thereby. The primary charger 112 is connected via the voltage rail 124 to a connector 134. The connector 134 is located so as to be easily accessible to a user of the watercraft 10. In one embodiment, the connector 134 is connected to a wall defined by the cowling 50 that is located behind the front cover panel 74 of the cowling 50. As such, the connector 134 can be easily accessed by removing the front cover panel 74. It is contemplated that the connector 134 could be located elsewhere. The battery cables 114 are connected between the connector 134 and the primary battery 90 such that the primary charger 112 can charge the primary battery 90 when the engine 26 is in operation.

The display gauge(s) 30, the starter motor 88, the fish finder 32 and one or more bilge pumps 136 are connected to the primary battery 90 to be powered thereby. The one or more bilge pumps 136 are disposed at the bottom of the hull 12 to pump any water that may accumulate in the hull 12 back to the body of water 116. It is contemplated that one or more of the display gauge(s) 30, the fish finder 32 and bilge pump(s) 136 may be omitted or may be powered by a power source other than the battery 90. It is also contemplated that other components could be connected to and powered by the battery 90. The one or more display gauges 30 are connected to the micro-controller 110 to receive information therefrom as will be discussed below. Alternatively or additionally, the one or more display gauges 30 could be connected to the auxiliary charger 92 by bypassing the micro-controller 110.

The fuel injectors 132, the oil injectors 138 and the ignition coils 98 are connected to the voltage rail 126 to be powered thereby. The oil injectors 138 of the engine 26 inject oil supplied from an oil tank (not shown) at various locations in the engine 26 that require lubrication.

Although not shown, the fuel pump 130, the fuel injectors 132, the oil injectors 138 and the ignition coils 98 are also connected to the primary battery 90 to be powered thereby during engine start-up. Once the engine 26 has started and the alternator generates power, these components are powered as described above.

The auxiliary charger 92 is connected via a connector 140 to the voltage rail 126 to be powered thereby. The auxiliary charger 92 is also connected to the micro-controller 110, via the connector 140, by a controlled area-network (CAN)-high wire 144, a CAN-low wire 146, and a "wake" wire 148. The auxiliary charger 92 is also connected to the EMM 100 by a ground wire 142. Although only a single wire for the voltage rail 126 and a single ground wire 142 are shown, it is contemplated that each could be replace by two or more wires in parallel should the electric power supplied by the voltage rail 126 be high, thus allowing the use of smaller gauge wires. The ground wire 142 or other ground wires (not shown) can also be connected to other electric/electronic components of the marine outboard engine 18 and the watercraft 10. The voltage rail 126 is connected to the ground wire 142 via filter capacitor 150 to smooth the supply voltage of the voltage rail 126. It is contemplated that a similar arrangement could be provided for the voltage rails 124 and 128. The CAN-High wire 144 and the CAN-low wire 146 are part of a CAN bus connecting the micro-controller 110 to the auxiliary charger 92. The CAN bus allows the exchange of data between the micro-controller 110 and the auxiliary charger 92 and also allows the micro-controller 110 to control the operation of the auxiliary charger 92 as will be described below. The one or more gauges 30 are also connected to the micro-controller 110 by a CAN bus. It is contemplated that the micro-controller 110 and the auxiliary charger 92 could be connected to each other via a different type of vehicle bus. The wake wire 148 allows the micro-controller 110 to send a signal to the auxiliary charger 92 to turn it on. It is contemplated that the wake wire 148 could be omitted and that this signal could be provided by one of the CAN-high wire 144 and the CAN-low wire 146 or that the auxiliary charger 92 could turn on when voltage is supplied by the voltage rail 126 to the auxiliary charger 92.

The auxiliary charger 92 is connected to a connector 152. The connector 152 is located so as to be easily accessible to a user of the watercraft 10. In one embodiment, the connector 152 is connected to a wall defined by the cowling 50 that is located behind the front cover panel 74 of the cowling 50 in the same manner as in the embodiment described above with respect to the connector 134. As such, the connector 152 can be easily accessed by removing the front cover panel 74. It is contemplated that the connector 152 could be located elsewhere. The battery cables 48 are connected between the connector 152 and the one or more auxiliary batteries 46 such that the auxiliary charger 92 can charge the one or more auxiliary batteries 46 when the engine 26 is in operation.

The trolling motor 20 and one or more auxiliary devices 154, some of which have been described above, are connected to the one or more auxiliary batteries 46 to be powered thereby. It is contemplated that the trolling motor 20 or one or more of the auxiliary devices 154 may be omitted. It is contemplated that the fish finder 32 described above as being connected to the primary battery 90 could alternatively be connected to the one or more auxiliary batteries 46.

As mentioned above, the CAN bus allows the exchange of data between the micro-controller 110 and the auxiliary charger 92 and also allows the micro-controller 110 to control the operation of the auxiliary charger 92. The micro-controller 110 receives a signal representative of the input voltage of the auxiliary charger 92 that is supplied by the voltage rail 126. When the micro-controller 110 determines that this input voltage reduces, the micro-controller 110 sends a signal to the auxiliary charger 92 to reduce its output current to the one or more batteries 46. The micro-controller 110 also receives signals representative of the input voltages of the fuel injectors 132, oil injectors 138 and ignition coils 98. When the micro-controller 110 determines that one or more of these input voltages are below predetermined values for each of these electrically powered components, the micro-controller 110 sends a signal to the auxiliary charger 92 to reduce its output current to the one or more batteries 46. The micro-controller 110 also receives signals representative of a voltage of the primary battery 90. When the micro-controller 110 determines that the voltage of the primary battery 90 is below a predetermined value, 10 volt for a 12 volt battery for example, the micro-controller 110 sends a signal to the auxiliary charger 92 to reduce its output current to the one or more batteries 46. It is contemplated that only some of the data received by the micro-controller 110 could be used to control the auxiliary charger 92.

In an alternative embodiment, the micro-controller 110 sends data to the auxiliary charger 92 that is representative of an operational state of the primary charger 112 and/or of a charge level of the primary battery 90. The data representative of the operational state of the primary charger 122 can include, for example, data representative of one or more of input voltage, input current, output voltage, output current and temperature of the primary charger 112. The operation of the auxiliary charger 92 is then adjusted based on this data. As a result, the output current of the auxiliary charger 92 will be controlled such that the primary charger 112 and/or the charge level of the primary battery 90 remain within desired values. The data received by the micro-controller 110 described above can also be taken into consideration by the auxiliary charger 92.

The data exchanged between the auxiliary charger 92 and the micro-controller 110 can also include data representative of one or more of the current battery charging rate of the auxiliary charger 92, the charge level of the one or more auxiliary batteries 46, the estimated remaining time of use of the one or more auxiliary batteries 46, a temperature of the auxiliary charger 92 and a temperature of the one or more auxiliary batteries 46. This data is provided to the one or more display gauges 30 via the CAN bus to be displayed to a user of the watercraft 10.

Figure 8:
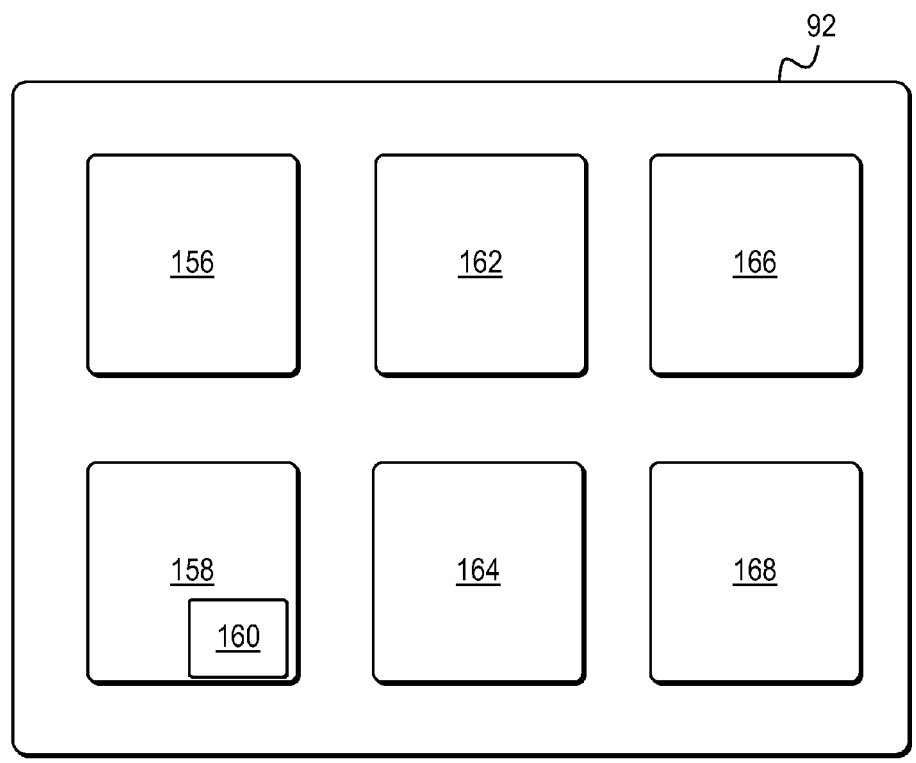
FIG. 8 is a schematic illustration of the components of an auxiliary charger of the watercraft of FIG. 1.

Turning now to FIG. 8, the components of the auxiliary charger 92 will be described. The auxiliary charger 92 includes a DC/DC converter 156 to reduce (or increase as the case may be) the input voltage received by the voltage rail 126 to the output voltage corresponding to the voltage of the one or more auxiliary batteries 46. In one embodiment, the DC/DC converter 156 is a non-synchronous Buck circuit. The auxiliary charger 92 is also provided with a micro-controller 158 that controls the operation of the DC/DC converter 156 and provides the micro-controller 110 with diagnostic information concerning the auxiliary charger 92. A gate drive 160 amplifies the signals from the micro-controller 158. The auxiliary charger 92 also has a CAN transceiver 162 that forms part of the CAN bus and connects to the CAN-high wire 144 and the CAN-low wire 146. A power supply 164 reduces the input voltage supplied by the voltage rail 126 and reduces it to power levels suitable for the operation of the micro-controller 158 and the gate drive 160, which may be different, and supplies this power to the micro-controller 158 and the gate drive 160. The auxiliary charger 92 is also optionally provided with a relay 166 that disconnects the auxiliary charger 92 from the one or more auxiliary batteries 46 should conditions exist that could damage the auxiliary charger 92 or the one or more batteries 46, such as a short circuit or the batteries 46 being improperly connected to each other for example. The relay 166 can be controlled by the micro-controller 110 or the micro-controller 158. The auxiliary charger 92 can also be optionally provided with a rectifier 168 that can be connected to an AC power outlet. The rectifier 168 converts the AC power to DC power and supplies it to the DC/DC converter 156 to permit the charging of the one or more auxiliary batteries 46 when the watercraft 10 is not in operation without having to remove the batteries 46 from the watercraft 10.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A marine outboard engine comprising:
an engine;
a cowling covering the engine;
a driveshaft operatively connected to the engine;
a propeller shaft operatively connected to the driveshaft, the propeller shaft being disposed at an angle to the driveshaft;
an alternator operatively connected to the engine to generate electrical power;
a controller disposed inside the cowling and being electrically connected to the alternator;
a primary charger disposed inside the cowling and being electrically connected to the alternator, the primary charger being adapted to charge a primary energy storage device;
a starter motor selectively operatively connected to the engine, the starter motor being adapted to be electrically connected to the primary energy storage device to be powered by the primary energy storage device;
an auxiliary charger disposed inside the cowling and being electrically connected to the alternator, the auxiliary charger being adapted to charge at least one auxiliary battery, the at least one auxiliary battery being adapted to power an auxiliary device; and
a vehicle bus connecting the auxiliary charger with the controller to provide data from the controller to the auxiliary charger.

2. The marine outboard engine of claim 1, wherein the controller and the primary charger are part of an engine management module (EMM), the EMM outputting electric power to a first voltage rail via the primary charger, the first voltage rail being adapted to be connected to the primary energy storage device, the EMM outputting electric power to a second voltage rail being electrically connected to the auxiliary charger; and
wherein a voltage of the first voltage rail is different from a voltage of the second voltage rail.

3. The marine outboard engine of claim 2, wherein the voltage of the first voltage rail is 12 V and the voltage of the second voltage rail is 55 V.

4. The marine outboard engine of claim 2, wherein the engine includes at least one fuel injector; and
wherein the at least one fuel injector is electrically connected to the second voltage rail.

5. The marine outboard engine of claim 1, wherein the at least one auxiliary battery is one of a single auxiliary battery, a pair of auxiliary batteries connected in series, and a trio of auxiliary batteries connected in series; and
wherein the auxiliary charger is adapted to charge any one of the single auxiliary battery, the pair of auxiliary batteries, and the trio of auxiliary batteries.

6. The marine outboard engine of claim 1, wherein the auxiliary charger includes a DC/DC converter.

7. The marine outboard engine of claim 1, wherein the controller reduces an output current of the auxiliary charger when an input voltage of the auxiliary charger reduces.

8. The marine outboard engine of claim 2, wherein the engine includes at least one electrically powered component electrically connected to the second voltage rail; and
wherein the controller reduces an output current of the auxiliary charger when an input voltage of the at least one electrically powered component is below a predetermined value.

9. The marine outboard engine of claim 1, wherein the controller reduces an output current of the auxiliary charger when a voltage of the primary energy storage device is below a predetermined value.

10. The marine outboard engine of claim 1, wherein the vehicle bus connecting the auxiliary charger to the controller exchanges data between the controller and the auxiliary charger.

11. The marine outboard engine of claim 10, wherein the data exchanged between the auxiliary charger and the controller includes data representative of at least one of current battery charging rate, charge level of the at least one auxiliary battery, estimated remaining time of use of the at least one auxiliary battery and temperature of at least one of the auxiliary charger and the at least one auxiliary battery.

12. The marine outboard engine of claim 1, further comprising:
   a first connector electrically connected to the primary charger and being adapted to electrically connect to the primary energy storage device; and
   a second connector electrically connected to the auxiliary charger and being adapted to electrically connect to the at least one auxiliary battery.

13. The marine outboard engine of claim 1, wherein the vehicle bus is a controlled area network (CAN) bus.

14. The marine outboard engine of claim 1, further comprising an open-loop liquid cooling system in thermal communication with the engine for cooling the engine; and
   wherein a portion of the open-loop cooling system is in thermal communication with the controller.

15. The marine outboard engine of claim 14, wherein another portion of the open-loop cooling system is in thermal communication with the auxiliary charger.

16. The marine outboard engine of claim 1, wherein the primary energy storage device is a primary battery.

17. The marine outboard engine of claim 1, wherein the primary energy storage device is disposed externally of the cowling.

18. The marine outboard engine of claim 1, wherein the at least one auxiliary battery is disposed externally of the cowling.

19. The marine outboard engine of claim 1, wherein the auxiliary device is a trolling motor.

20. The marine outboard engine of claim 1, wherein the data provided by the controller to the auxiliary charger is representative of at least one of an operational state of the primary charger and a charge level of the primary energy storage device; and
   wherein operation of the auxiliary charger is adjusted based at least in part on the data.

21. A watercraft comprising:
   a hull;
   an auxiliary device connected to the hull;
   at least one auxiliary battery electrically connected to the auxiliary device to power the auxiliary device;
   a marine outboard engine connected to the hull; and
   a primary energy storage device electrically connected to the marine outboard engine,
   the marine outboard engine including:
      an engine;
      a cowling covering the engine;
      a driveshaft operatively connected to the engine;
      a propeller shaft operatively connected to the driveshaft, the propeller shaft being disposed at an angle to the driveshaft;
      a propeller connected to the propeller shaft;
      an alternator operatively connected to the engine to generate electrical power;
      a controller disposed inside the cowling and being electrically connected to the alternator;
      a primary charger disposed inside the cowling and being electrically connected to the alternator, the primary charger being electrically connected to the primary energy storage device to charge the primary energy storage device;
      a starter motor selectively operatively connected to the engine, the starter motor being electrically connected to the primary energy storage device to be powered by the primary energy storage device;
      an auxiliary charger disposed inside the cowling and being electrically connected to the alternator, the auxiliary charger being electrically connected to the at least one auxiliary battery to charge the at least one auxiliary battery; and
      a vehicle bus connecting the auxiliary charger with the controller to provide data from the controller to the auxiliary charger.

22. The watercraft of claim 21, wherein the controller and the primary charger are part of an engine management module (EMM), the EMM outputting electric power to a first voltage rail via the primary charger, the first voltage rail being connected to the primary energy storage device, the EMM outputting electric power to a second voltage rail being electrically connected to the auxiliary charger; and
   wherein a voltage of the first voltage rail is different from a voltage of the second voltage rail.

23. The watercraft of claim 22, wherein the voltage of the first voltage rail is 12 V and the voltage of the second voltage rail is 55 V.

24. The watercraft of claim 22, wherein the engine includes at least one fuel injector; and
   wherein the at least one fuel injector is electrically connected to the second voltage rail.

25. The watercraft of claim 21, wherein the at least one auxiliary battery is one of a single auxiliary battery, a pair of auxiliary batteries connected in series, and a trio of auxiliary batteries connected in series; and
   wherein the auxiliary charger is adapted to charge any one of the single auxiliary battery, the pair of auxiliary batteries, and the trio of auxiliary batteries.

26. The watercraft of claim 21, wherein the auxiliary charger includes a DC/DC converter.

27. The watercraft of claim 21, wherein the controller reduces an output current of the auxiliary charger when an input voltage of the auxiliary charger reduces.

28. The watercraft of claim 22, wherein the engine includes at least one electrically powered component electrically connected to the second voltage rail; and
   wherein the controller reduces an output current of the auxiliary charger when an input voltage of the at least one electrically powered component is below a predetermined value.

29. The watercraft of claim 21, wherein the controller reduces an output current of the auxiliary charger when a voltage of the primary energy storage device is below a predetermined value.

30. The watercraft of claim 21, wherein the vehicle bus connecting the auxiliary charger to the controller exchanges data between the controller and the auxiliary charger.

31. The watercraft of claim 30, wherein the data exchanged between the auxiliary charger and the controller includes data representative of at least one of current battery charging rate, charge level of the at least one auxiliary battery, estimated remaining time of use of the at least one auxiliary battery and temperature of at least one of the auxiliary charger and the at least one auxiliary battery.

32. The watercraft of claim 31, further comprising:
   a first connector electrically connected to the primary charger and to the primary energy storage device; and
   a second connector electrically connected to the auxiliary charger and to the at least one auxiliary battery.

33. The watercraft of claim 31, wherein the vehicle bus is a controlled area network (CAN) bus.

34. The watercraft of claim 31, further comprising an open-loop liquid cooling system in thermal communication with the engine for cooling the engine; and wherein a portion of the open-loop cooling system is in thermal communication with the controller.

35. The watercraft of claim 34, wherein another portion of the open-loop cooling system is in thermal communication with the auxiliary charger.

36. The watercraft of claim 31, wherein the primary energy storage device is a primary battery.

37. The watercraft of claim 31, wherein the primary energy storage device is disposed externally of the cowling.

38. The watercraft of claim 31, wherein the at least one auxiliary battery is disposed externally of the cowling.

39. The watercraft of claim 31, wherein the data provided by the controller to the auxiliary charger is representative of at least one of an operational state of the primary charger and a charge level of the primary energy storage device; and wherein operation of the auxiliary charger is adjusted based at least in part on the data.

40. The watercraft of claim 31, further comprising at least one display gauge connected to the controller to display information representative of the data.

41. The watercraft of claim 21, further comprising at least one display gauge connected to the auxiliary charger via the vehicle bus to display information related to the auxiliary charger.

42. The watercraft of claim 21, wherein the auxiliary device is a trolling motor and the at least one auxiliary battery is at least one trolling motor battery.

43. The watercraft of claim 21, wherein the auxiliary device is at least one of an electric cooler, a fridge, a stove, a fish finder and a pump of a livewell.

44. The watercraft of claim 31, further comprising at least one of a fish finder, a display gauge and a bilge pump electrically connected to the primary energy storage device.

* * * * *